US005500027A

United States Patent [19]

Rudolph et al.

[11] Patent Number: 5,500,027

[45] Date of Patent: Mar. 19, 1996

[54] AEROSOL GENERATOR

[75] Inventors: Andreas Rudolph, Dresden; Klaus J. Mueller, Ulberndorf; Christian Peters, Rostock; Justus Altmann, Dresden, all of Germany

[73] Assignee: Topas GmbH, Dresden, Germany

[21] Appl. No.: 226,927

[22] Filed: Apr. 13, 1994

[30] Foreign Application Priority Data

Apr. 21, 1993 [DE] Germany .......................... 43 12 983.8

[51] Int. Cl.[6] .................................................. B01D 35/147

[52] U.S. Cl. ................................ 55/223; 55/226; 55/312; 73/3; 261/22; 261/63

[58] Field of Search ............................ 55/312, 223, 226; 95/226; 261/22, 63, 121.1, DIG. 65; 73/3, 861.04; 128/204.14, 205.12, 205.29

[56] References Cited

U.S. PATENT DOCUMENTS

| | | | |
|---|---|---|---|
| 3,206,449 | 9/1965 | Van Luik, Jr. | 55/312 X |
| 3,545,500 | 12/1970 | Bovio et al. | 55/312 X |
| 3,941,861 | 3/1976 | Hamalainen et al. | 261/DIG. 65 |
| 4,193,967 | 3/1980 | Black | 55/223 X |
| 4,406,843 | 9/1983 | Nakamura et al. | 261/121.1 X |
| 4,407,134 | 10/1983 | Snaper | 55/312 X |
| 4,582,480 | 4/1986 | Lynch et al. | 261/22 X |

*Primary Examiner*—Richard L. Chiesa
*Attorney, Agent, or Firm*—Jordan and Hamburg

[57] ABSTRACT

An aerosol generator specially designed for the generation of monodisperse aerosols such as calibration aerosols for the testing of measuring equipment and filters; for aerosols for making streams visible or for inhalation aerosols for medical purposes. An aerosol generator, based upon the Sinclair La Mer-principle, has been modified by inserting a nuclei removing section combined with a valve bypass between the nuclei source and the saturator.

5 Claims, 1 Drawing Sheet

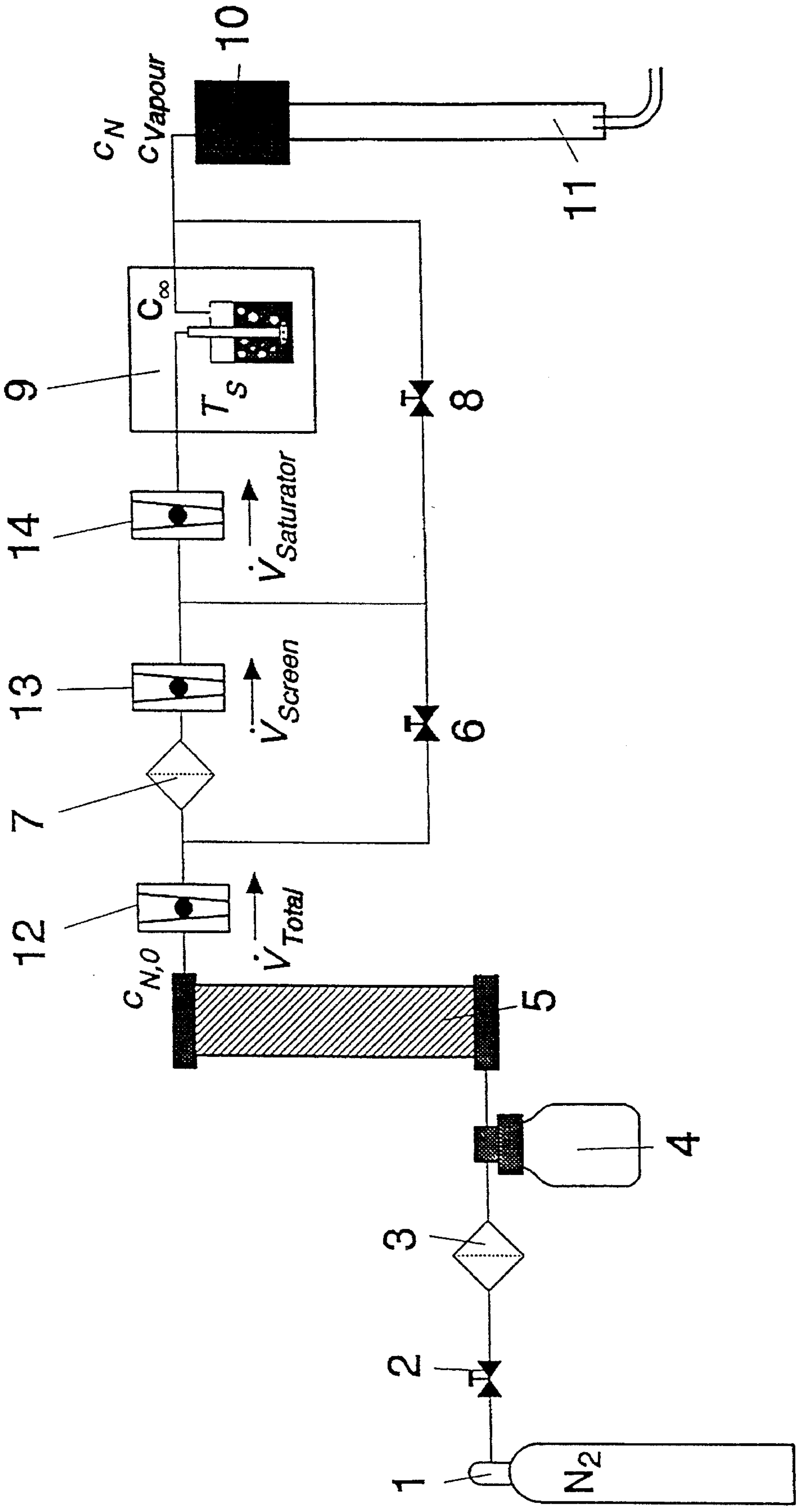
1
2
3
4
5
6
7
8
9
10
11
12
13
14
N2
cN
cVapour
cN,0
V̇Total
V̇Screen
V̇Saturator
TS
C∞

AEROSOL GENERATOR

BACKGROUND OF THE INVENTION

The invention concerns an aerosol generator especially for the generation of monodisperse aerosols such as calibration aerosols for the testing of measuring equipment and filters, aerosols for making streams visible or inhalation aerosols for medical purposes.

The production of highly concentrated monodisperse aerosols is based on the principle of controlled heterogeneous condensation: vaporized aerosol material condenses in the same fashion onto substantially smaller condensation nuclei. This forced condensation allows a high degree of monodispersity also at very high concentrations.

According to the principle of Sinclair-La Mer, nuclei are produced by an external nuclei source by vaporizing material from heated wires. Saturation of the gas stream with vapour of the aerosol material is achieved by a gas flow above the surface of the thermostated aerosol substance (heated at a temperature below the boiling point of the aerosol material). The particle size is adjusted by means of the temperature.

Following the Rappaport-Weinstock method, deliberately polluted aerosol material is passed through a jet spray and downstream heated to above the boiling point of the material to be used. The material evaporates completely. The impurities, which have not evaporated, serve as condensation nuclei for the heterogeneous condensation.

The particle size can be adjusted slowly and gradually by means of change in both temperature and choice of aerosol substance.

The aerosol generator developed by Prodi operates in accordance with the Sinclair-la-Mer-principle, whereby the condensation nuclei do not flow above the heated aerosol substance, rather they flow in a saturator through the aerosol substance, still in liquid form. The nuclei-vapour-mixture concentration and the particle size can also be adjusted by bypasssing this saturator, in addition to effecting adjustment by changing the temperature. The adjustment of the particle size is only possible over a small range. For higher requirements the degree of reproducibility is insignificant.

SUMMARY OF THE INVENTION

The purpose of this invention is to modify an aerosol generator according to the Sinclair-La Mer-principle. This method ensures that the particle size, as well as the concentration thereof, can be adjusted independently of each other over a wide range and with a high degree of reproducibility.

In accordance with the invention this can be achieved by inserting a nuclei removing section in combination with a bypass between the nuclei source and the saturator.

Using this nuclei removing section-bypass-switch, the concentration of the nuclei, and subsequently that of the aerosol particles can be freely varied. In addition, larger particles, than that which was previously possible, can now be produced. The largest particle size is limited by the transition into the homogeneous condensation. The corresponding nuclei concentration, which still allows heterogeneous condensation, can be rapidly and accurately adjusted using the screen bypass. Up to now, the technical solutions described do not provide the required accuracy in the adjustment of nuclei concentration.

Through a combination of bypassing the saturator and adjusting the total as well as partial flowrates, particles of almost identical size can be produced over a wide range with high accuracy and constant number concentration.

First experimental results have shown that the geometric standard deviation over the entire size-range possible from 0.1 to 8 m was less than 1.15 in all cases.

BRIEF DESCRIPTION OF THE DRAWINGS

The sole drawing FIGURE is an aerosol generator of the present invention

DETAILED DESCRIPTION OF THE PREFERRED EMBODIMENT

For the carrier gas an inert gas (e.g. nitrogen) is used in order to avoid chemical reactions with the aerosol material to be used. After the external gas supply 1 a pressure regulator 2 is used to facilitate the adjustment of the total flowrate through the generator. The downstream switched filter 3 cleans the gas in order that, independent of the purity grade of the carrier gas to be used, constant results are achieved. An NaCl-solution is passed through an atomizer 4, which serves as a nuclei source. The impaction precipitator, which is integrated into the atomizer, allows only droplets smaller than 1 to 3 μm to leave the atomizer. The water is extracted from them in a diffusion dryer 5. The resulting salt crystals indicate that, depending upon the concentration of the various solutions, particle sizes range from 10 to 100 nm. The degree of the concentration of the salt crystals $c_{N;0}$ is also dependent upon the solution concentration. High concentrations lead also to a high degree of concentration of the aerosol being produced.

Using the first parallel circuitry, comprising a combination of a diffusion screen 7 and bypass-with-valve 6 said screen bypass, the concentration of the nuclei can be adjusted over a range from nearly 0 up to $c_N$. Nearly all nuclei are removed in the stream passing through the diffusion screen 7

$$c_N = c_{N,0} * \frac{\dot{V}_{total} - \dot{V}_{screen}}{\dot{V}_{total}} \qquad (1)$$

Using the second parallel circuitry, consisting of a saturator 9 and the bypassing valve 8, (saturator bypass), the vapour concentration $c_{Vapour}$ can be adjusted. A partial stream passes through the saturator 9 and is saturated with the vapour of the aerosol material, depending on both saturator temperature $T_S$ and saturation vapour pressure $p(T_S)$. The saturation concentration $c_\infty$ is almost reached. The higher the partial flowrate through the bypass valve 8, the smaller the vapour concentration $c_{Vapour}$ compared with the saturation vapour concentration $c_\infty$.

The size of the particles to be produced is determined by the ratio of vapour available per nuclei. The particle volume is proportional to the ratio between vapour and nuclei concentration.

$$d_m^3 \sim \frac{c_{vapour}}{c_N} \qquad (2)$$

The particle size dependency is obtainable by a balance of mass and by the regulation of the bypass as indicated and can be summarized as follows:

$$d_m^3 \sim \frac{p_s(T_s)}{T_s} \cdot \frac{1}{C_{N,0}} \cdot \frac{\dot{V}_{saturator}}{\dot{V}_{screen}} \qquad (3)$$

key:
dm: the median particle size
pS: saturation vapour pressure of the aerosol material
TS: temperature of the saturator
cN;0: nuclei concentration before entering the screen bypass
VSaturator: saturator flowrate
VScreen: flowrate through the diffusion screen The flowrate of the volume of the stream flowing through the entire generator is measured by flowmeter 12, while the flowrate of the volume of the stream flowing through the nuclei removing section 7 and saturator 9 are measured by flowmeters 13 and 14, respectively.

In the reheater 10 the nuclei vapour mixture is heated to above the boiling point of the aerosol substance. This way one ensures that prematurely formed condensation is re-evaporated and does not affect the aerosol to be produced.

In a laminal stream system the nuclei vapour mixture is cooled down inside the condensation tube 11. Supersaturation caused by this, leads to the condensation of the vapour onto the nuclei.

In a further (not displayed) example of execution, an additional diffusion screen with a bypassing valve is used to bypass the saturator bypass 9 or is inserted into the saturator bypass. The amount of condensation nuclei is further reduced. Large aerosol particles are produced.

What is claimed is:

1. An aerosol generator comprising a nuclei source, a saturator, and a combination of a means for removing nuclei and a means for bypassing the means for removing nuclei parallel to the means for removing nuclei, the combination being between the nuclei source and the saturator.

2. An aerosol generator as in claim 1, further comprising means for bypassing the saturator, the means for bypassing the saturator being downstream of the means for removing nuclei.

3. An aerosol generator as in claim 1, further comprising another means for removing nuclei and another means for bypassing the another means for removing nuclei in a means for bypassing the saturator.

4. An aerosol generator as in claim 1, further comprising a first means for measuring flowrate of the volume of the stream flowing through the aerosol generator, a second means for measuring flowrate of the volume of the stream flowing through the means for removing nuclei and a third means for measuring flowrate of the volume of the stream flowing through the saturator.

5. An aerosol generator as in claim 1, wherein the means for removing nuclei is a diffusion screen.

* * * * *